(12) United States Patent
Fontaine et al.

(10) Patent No.: US 10,308,134 B2
(45) Date of Patent: Jun. 4, 2019

(54) SPHERICAL WHEEL/TIRE ASSEMBLY

(71) Applicant: The Goodyear Tire & Rubber Company, Akron, OH (US)

(72) Inventors: Sebastien Willy Fontaine, Vichten (LU); Frederic Ngo, Blaschette (LU); Armand René Gabriel Leconte, Bigonville (LU); Stéphane Laurent Claude Bokken, Vielsalm (BE); Claude Ernest Felix Boes, Erpeldange-sur-Sûre (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 122 days.

(21) Appl. No.: 15/708,233

(22) Filed: Sep. 19, 2017

(65) Prior Publication Data
US 2018/0251040 A1    Sep. 6, 2018

Related U.S. Application Data

(60) Provisional application No. 62/465,866, filed on Mar. 2, 2017.

(51) Int. Cl.
| *B60L 13/10* | (2006.01) |
|---|---|
| *C08G 77/26* | (2006.01) |
| *C08C 19/22* | (2006.01) |
| *B60C 19/00* | (2006.01) |
| *B60C 1/00* | (2006.01) |

(Continued)

(52) U.S. Cl.
CPC ............ *B60L 13/10* (2013.01); *B60C 1/0016* (2013.01); *B60C 7/105* (2013.01); *B60C 11/0083* (2013.01); *B60C 19/00* (2013.01); *C08C 19/22* (2013.01); *C08G 77/26* (2013.01); *B60C 2019/005* (2013.01); *B60L 2200/14* (2013.01); *B60L 2220/44* (2013.01)

(58) Field of Classification Search
CPC .. B60L 13/10; B60L 2220/44; B60L 2200/14; B60C 7/105; B60C 11/0083; B60C 1/0016; B60C 19/00; B60C 2019/005; C08C 19/22; C08G 77/26
See application file for complete search history.

(56) References Cited

U.S. PATENT DOCUMENTS

| 1,495,347 A | 5/1924 | Neubauer |
|---|---|---|
| 1,905,345 A | 4/1933 | Dandini |
| (Continued) | | |

FOREIGN PATENT DOCUMENTS

| CA | 2794486 A1 | 5/2014 |
|---|---|---|
| DE | 102007001327 A1 | 7/2008 |

*Primary Examiner* — Darlene P Condra
(74) *Attorney, Agent, or Firm* — Robert N. Lipcsik

(57) ABSTRACT

A support assembly for a vehicle travels along a road surface and rotates relative to the road surface and the vehicle. The first support assembly includes a spherical tread layer for contacting the road surface, a foam layer adjacent the spherical tread layer, the foam layer including adjustable elements for altering an outer physical contour of the spherical tread layer, the outer physical contour contacting the road surface, a spherical wheel/tire for supporting the spherical tread layer and the vehicle, and a drive system magnetically driving rotation of the spherical wheel/tire relative to the vehicle such that no portion of the spherical tread layer physically contacts the vehicle.

16 Claims, 1 Drawing Sheet

(51) Int. Cl.
  *B60C 11/00*   (2006.01)
  *B60C 7/10*   (2006.01)

(56) References Cited

U.S. PATENT DOCUMENTS

| | | |
|---|---|---|
| 2,009,904 A | 7/1935 | Purves |
| 2,267,254 A | 12/1941 | Reilley |
| 2,372,043 A | 3/1945 | Aghnides |
| 3,327,801 A | 6/1967 | Ezra |
| 3,746,117 A | 7/1973 | Alred |
| 3,747,956 A | 7/1973 | Heberlein |
| 3,798,835 A | 3/1974 | McKeehan |
| 4,501,569 A | 2/1985 | Clark |
| 4,726,800 A | 2/1988 | Kobayashi |
| 5,263,419 A | 11/1993 | Moroto |
| 5,533,921 A | 7/1996 | Wilkinson |
| 6,227,933 B1 | 5/2001 | Michaud |
| 6,289,263 B1 | 9/2001 | Mukherjee |
| 6,414,457 B1 | 7/2002 | Agrawal |
| 8,099,189 B2 | 1/2012 | Kaznov |
| 8,166,741 B2 | 5/2012 | Barguet |
| 8,232,699 B2 | 5/2012 | Letang |
| 8,269,447 B2 | 9/2012 | Smoot |
| 8,430,192 B2 | 4/2013 | Gillett |
| 8,459,383 B1 | 6/2013 | Burget |
| 8,467,948 B2 | 6/2013 | Takenaka |
| 8,600,600 B2 | 12/2013 | Jung |
| 8,670,889 B2 | 3/2014 | Kaznov |
| 8,788,130 B1 | 7/2014 | Tran |
| 8,962,730 B2 * | 2/2015 | Mruk ............... C08K 3/08 152/502 |
| 9,090,214 B2 | 7/2015 | Bernstein et al. |
| 9,211,920 B1 | 12/2015 | Bernstein et al. |
| 2004/0192163 A1 | 9/2004 | Siegel |
| 2006/0162610 A1 | 7/2006 | Reboredo Losada |
| 2009/0188729 A1 | 7/2009 | Berry |
| 2011/0186368 A1 * | 8/2011 | Ueno ............... H02J 5/005 180/65.31 |
| 2014/0246133 A1 * | 9/2014 | Lamontia ........... B60C 19/002 152/151 |
| 2018/0361791 A1 * | 12/2018 | Rigo ............... B60C 7/125 |

* cited by examiner

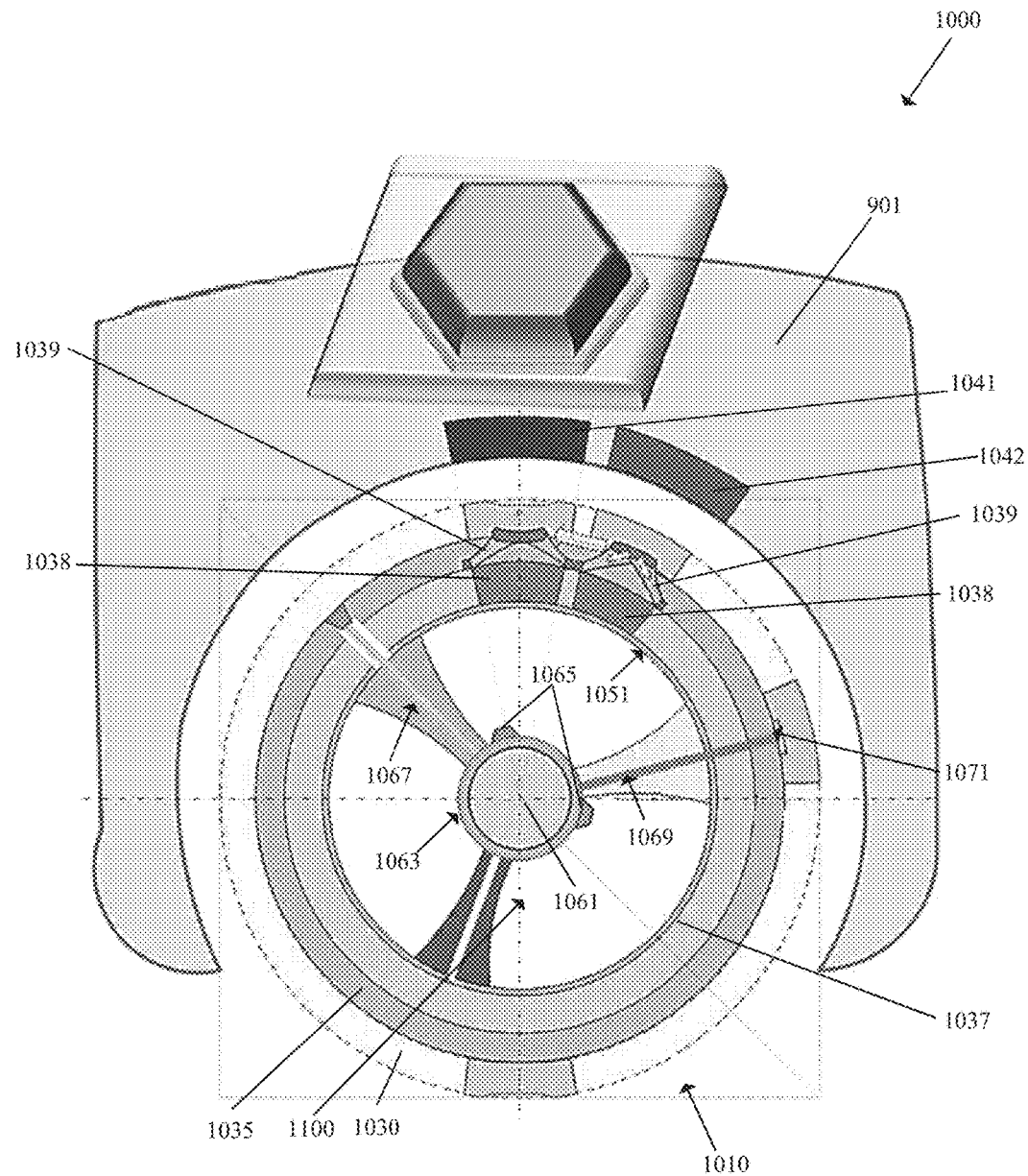

SPHERICAL WHEEL/TIRE ASSEMBLY

FIELD OF INVENTION

The present invention relates to transportation, and, more particularly, to an assembly for supporting a vehicle while traversing a ground or other surface.

BACKGROUND OF THE PRESENT INVENTION

A conventional device may include a spherical housing and an internal drive system including one or more motors coupled to one or more wheels engaged to an inner surface of the spherical housing. A biasing mechanism, including a spring and contact end, may be coupled to the internal drive system to provide diametrically opposing force between the wheels and contact end to allow for power to the motors to be transferred to the inner surface of the spherical housing, causing the self-propelled device to roll along a contact surface. The self-propelled device may rotate based on a combination of movement of its center of mass, independent power to the motors, and the force of the biasing mechanism against the inner surface. A magnetic coupling component may be included with the biasing mechanism. The magnetic coupling component may comprise ferrous metal or a permanent magnet, such as a neodymium magnet, to provide a magnetic field through the spherical housing to magnetically interact with external devices and/or accessories.

BRIEF DESCRIPTION OF THE DRAWINGS

The disclosure herein is described by way of example, and not by way of limitation, in the FIGURES of the accompanying drawings and in which like reference numerals refer to similar elements, and in which:

FIG. 1 schematically illustrates an assembly in accordance with the present invention.

SUMMARY OF THE INVENTION

A first support assembly for a vehicle, in accordance with the present invention, travels along a road surface and rotates relative to the road surface and the vehicle. The first support assembly includes a spherical tread layer for contacting the road surface, a foam layer adjacent the spherical tread layer, the foam layer including adjustable elements for altering an outer physical contour of the spherical tread layer, the outer physical contour contacting the road surface, a spherical wheel/tire for supporting the spherical tread layer and the vehicle, and a drive system magnetically driving rotation of the spherical wheel/tire relative to the vehicle such that no portion of the spherical tread layer physically contacts the vehicle.

According to another aspect of the first support assembly, the drive system includes a radially extending fiber optic element for external communication, a radially extending electronic communication/power bus, and an energy harvester disposed in a foam layer.

According to still another aspect of the first support assembly, the drive system magnetically levitates the vehicle a first predetermined distance from the spherical wheel/tire and magnetically maintains the drive system at a constant orientation relative to the road surface.

According to yet another aspect of the first support assembly, the spherical tread layer includes a rubber composition comprising an elastomer bearing a multidentate ligand capable of complexing with a metal ion, and a metal ion.

According to still another aspect of the first support assembly, the elastomer is a copolymer comprising polydimethylsiloxane chains with 2,6-pyridinecarboxamide ligands incorporated within the polymer chains.

According to yet another aspect of the first support assembly, the elastomer includes a functionalized elastomer comprising a polymeric backbone chain derived from a monomer including at least one conjugated diene monomer and optionally at least one vinyl aromatic monomer; and a functional group bonded to the backbone chain, the functional group comprising a multidentate ligand capable of complexing with a metal ion.

According to still another aspect of the first support assembly, the functionalized elastomer is of formula (I)

$$X + Y\text{-}Z]_n \qquad (I)$$

wherein X is a polymer derived from a monomer comprising at least one conjugated diene monomer and optionally at least one vinyl aromatic monomer, Z comprises a multidentate ligand group capable of complexing with a metal ion, Y is a divalent group bonded to both X and Z, and n is the number of +Y-Z] groups bonded to X.

According to yet another aspect of the first support assembly, Z includes a ligand selected from the group consisting of a substituted bipyridinyl groups, unsubstituted bipyridinyl groups, substituted terpyridinyl groups, unsubstituted terpyridinyl groups, substituted phenanthrolinyl groups, unsubstituted phenanthrolinyl groups, substituted pyrazinyl groups, and unsubstituted pyrazinyl groups.

According to still another aspect of the first support assembly, the drive system includes a magnetically passive component that responds to variations of a magnetic field.

According to yet another aspect of the first support assembly, drive system includes a magnetically active component that generates variations in the magnetic field.

A second support assembly for a vehicle, in accordance with the present invention, travels along a road surface and rotates relative to the road surface and the vehicle. The second support assembly includes a spherical tread layer for contacting the road surface, a foam layer disposed radially inward of the spherical tread layer, a magnetic layer disposed radially inward of the foam layer, and a drive system magnetically driving rotation of the magnetic layer relative to the vehicle such that no portion of the spherical tread layer physically contacts the vehicle.

According to another aspect of the second support assembly, the magnetic layer includes diamagnetic elements for altering physical characteristics of the foam layer.

According to still another aspect of the second support assembly, the drive system includes a permanent magnetic element and an electromagnetic element.

According to yet another aspect of the second support assembly, the foam layer includes a material responsive to magnetic field variations such that the support assembly is controllably rotated about a spherical center of the spherical tread layer.

According to still another aspect of the second support assembly, the drive system magnetically levitates itself a second predetermined distance from an outer surface of the spherical tread layer.

A method supports a vehicle. The method includes the steps of: travelling along a road surface by the vehicle; rotating a spherical tread layer relative to the road surface and the vehicle with the spherical tread layer rolling along the road surface; magnetically driving rotation of a magnetic layer relative to the vehicle such that no portion of the spherical tread layer physically contacts the vehicle; and adjusting an outer contour of the spherical tread layer for improving the contact between the outer contour and the road surface.

According to another aspect of the method, another step includes altering a physical shape of an adjustable element radially beneath the spherical tread layer.

According to still another aspect of the method, another step includes powering alteration of the adjustable element by an energy harvester.

According to yet another aspect of the method, another step includes magnetically altering the adjustable element by the energy harvester.

According to still another aspect of the method, another step includes magnetically levitating the vehicle a first predetermined distance from the spherical tread layer.

DETAILED DESCRIPTION OF EXAMPLES OF THE PRESENT INVENTION

An example conventional device, such as that described in U.S. Pat. No. 9,090,214, U.S. Pat. No. 9,211,920, and U.S. patent application Ser. No. 15/065,959 to Fontaine et al., each incorporated by reference in their entirety herein, may include a spherical housing and an internal drive system including one or more motors coupled to one or more wheels engaged to an inner surface of the spherical housing. A biasing mechanism, including a spring and contact end, may be coupled to the internal drive system to provide diametrically opposing force between the wheels and contact end to allow for power to the motors to be transferred to the inner surface of the spherical housing, causing the self-propelled device to roll along a contact surface. The self-propelled device may rotate based on a combination of movement of its center of mass, independent power to the motors, and the force of the biasing mechanism against the inner surface. A magnetic coupling component may be included with the biasing mechanism. The magnetic coupling component may comprise ferrous metal or a permanent magnet, such as a neodymium magnet, to provide a magnetic field through the spherical housing to magnetically interact with external devices and/or accessories.

An example external accessory for the device may include a magnetic coupling component to magnetically couple with the magnetic coupling component of the biasing mechanism (e.g., the contact end). Accordingly, when the spherical housing of the self-propelled device is caused to roll, the external accessory can remain stably coupled to the contact end of the biasing mechanism via magnetic interaction through the spherical housing.

Either the self-propelled device, the external accessory, or both, may include a magnet (e.g., a neodymium magnet) to produce the magnetic field causing the magnetic interaction. Such interaction may involve a magnetic attraction in which contact occurs between the external accessory and the outer surface of the spherical housing. In such examples, friction may be reduced by coating the outer surface of the spherical housing and/or a contact surface of the external accessory with a substantially frictionless material. Additionally or alternatively, the magnetic interaction may involve a repulsive force including stability mechanism (e.g., one or more further magnets) to create stable magnetic levitation between the external accessory and the spherical housing.

As used herein, "substantially" means between 0° and less than 90° in the context of an angular rotation of the biasing mechanism while the self-propelled device is under operational control. Accordingly, a "substantially" stable, a "substantially" constant angle, or a "substantial" perpendicularity between the biasing mechanism (or spring component) and an external surface on which the self-propelled device rolls, means less than 90° with respect to that surface, and typically less than 45° while the self-propelled device is in a non-accelerated state. As further used herein, "substantially" in the context of friction between the outer surface of the spherical housing and the contact surface of the external accessory device, means a below normal frictional relation between two typical smooth surfaces (e.g., polished metal or wood surfaces). Thus, a "substantially" frictionless material means a material designed or manufactured for reduced friction.

One or more conventional examples described herein provide that methods, techniques, and actions performed by a computing device may be performed programmatically, or as a computer-implemented method. Programmatically, as used herein, means through the use of code or computer-executable instructions. These instructions may be stored in one or more memory resources of the computing device. A programmatically performed step may or may not be automatic.

One or more conventional examples described herein may be implemented using programmatic modules or components of a system. A programmatic module or component may include a program, a sub-routine, a portion of a program, a software component, and/or a hardware component capable of performing one or more stated tasks or functions. As used herein, a module or component may exist on a hardware component independently of other modules or components. Alternatively, a module or component may be a shared element or process of other modules, programs, and/or machines.

Some examples described herein may generally require the use of computing devices, including processing and memory resources. For example, one or more examples described herein may be implemented, in whole or in part, on computing devices such as digital cameras, digital camcorders, desktop computers, cellular/smart phones, personal digital assistants (PDAs), laptop computers, printers, digital picture frames, and/or tablet devices. Memory, processing, and network resources may all be used in connection with the establishment, use, and/or performance of any example described herein (including with the performance of any method and/or with the implementation of any system).

Furthermore, one or more examples described herein may be implemented through the use of instructions that are executable by one or more processors. These instructions may be carried on a computer-readable medium. Machines shown or described with FIGURES below provide examples of processing resources and computer-readable mediums on which instructions for implementing examples may be carried and/or executed. In particular, the numerous machines shown with examples may include processors and various forms of memory for holding data and instructions. Examples of computer-readable mediums may include permanent memory storage devices, such as hard drives on personal computers or servers. Other examples of computer storage mediums may include portable storage units, such as CD or DVD units, flash memory (such as carried on smart phones, multifunctional devices, and/or tablets), and magnetic memory. Computers, terminals, network enabled devices (e.g., mobile devices, such as cell phones) may all utilize processors, memory, and/or instructions stored on computer-readable mediums. Additionally, examples may be implemented in the form of computer-programs, or a non-transitory computer usable carrier medium capable of carrying such a program.

The spherical shape of this concept may transform the way autonomous or any vehicles move. The spherical, shape may positively contribute to the safety, maneuverability, and comfort to match the demands of autonomous and any mobility. The multi-orientation tires may move in all directions, contributing to safety and comfort for passengers, as well as coping with any space limitations. Active anti-sliding technology may allow the tire to move as needed to reduce sliding from potential hazards, such as black ice or sudden obstacles.

The spherical shape may provide a smooth ride to address passenger comfort. The spherical shape may create a fluid, lateral movement to help the car overtake any obstacles without changing its driving direction. Further, because 360 degree turns are possible with the spherical shape, anticipated parking constrictions may be overcome, as less space is needed for cars fitted with spherical tires to pull into parking spots. Assuming public parking areas play the same role in the future, this could significantly increase the capacity of public parking areas without increasing their overall size.

An example spherical tire/drive apparatus may rely on magnetic levitation to carry the load of a vehicle. Such a spherical tire may be suspended from the vehicle by magnetic fields similar to magnetic levitation trains, which result in increased comfort and reduced noise for users. Such an apparatus may allow total integration of moving parts into the body of the spherical tire and/or the body of the vehicle (e.g., no moving parts or critical surfaces exposed to the environment). Further, a recharging system, through magnetic induction, may be totally isolated from the external environment.

The apparatus may simplify manufacturing and assembly as well as eliminate some components entirely, such as rims, steering system, axles, shock absorbers, springs, etc., thereby also reducing weight and cost. The magnetic levitation and control may eliminate all direct contact between the vehicle and the road thereby mitigating vibration, noise, and other undesired effects of direct contact.

The spherical tire may have several spherical tread layers, which may or may not mimic the functionality of conventional tire treads. The structure interior to the spherical tread may be an auxetic or normal foam material which is strong enough to take the load of the vehicle, but flexible enough to allow the tread to deform and generate an appropriate contact patch with the road.

A magnetic material layer and/or a diamagnetic layer may be located interior to the spherical tread structure for providing the levitation and control between tires and the vehicle. The vehicle may be permanently levitated away from the spherical tires or the alternate levitation, so that the vehicle/tires expend no energy when the vehicle is at rest and unused. Diamagnetic materials may generate a magnetic field only if they themselves are brought into an active magnetic field.

One part or all of the energy for the magnetic fields may come from a battery inside the spherical tire or a battery in the vehicle. The battery in the spherical tire may be charged and recharged by inductive transfer from a battery in the vehicle.

An electric motor inside the spherical tire may provide the tire and the vehicle mobility, similar to that described above. Alternatively, magnetic pulses may emote the tire and vehicle. The load bearing portion of the spherical tire may be constructed of graphene layers or layers of carbon-fiber.

Further, a tire in accordance with the present invention may sense its environment, learn from it, decide on a course of action, transform its characteristics to further that decision, and/or there interact with its environment for an optimal performance. Thus the tire may revolutionize the interaction between tires, autonomous vehicles, and/or a new mobility ecosystem by integrating autonomy, mobility, agility, and/or connectivity.

For example, to safely navigate their surroundings, the partially and fully automated vehicles of the future will need to cope with the unexpected. To do so, the vehicle and its tires may access environmental data and seamlessly adjust the vehicle's performance and the tire's performance accordingly. The tire may utilize learned behavior to physically transform the tire features as part of the vehicle's nervous system. The vehicle and tires may thereby quickly adapt to changing circumstances, as well as evolving overall requirements of a "Mobility as a Service" (MAAS) fleets and their users.

This artificial intelligence may allow the tire to make decisions and alter tread features to enhance the tire's functional characteristics. The spherical shape of the tire may reduce aquaplaning as the artificial intelligence enables tread grooves to function autonomously at the optimal level through such road sensing and connectivity. For example, the spherical tread may transform from a slick to a grooved tread. Additionally, the tread material of a damaged tread may self-heal automatically. The artificial intelligence of the tire may communicate with the remote monitoring locations of vehicle fleets to predict wear and pro-active maintenance requirements.

Since the spherical tread may have four times the surface area of a standard tire, the spherical tread may wear much more slowly than the standard tread. Further, mounting and balancing will no longer be required. Since the spherical tire is non-pneumatic, punctures may not affect the global structure and operability of the tire. The internal structures of the tire may be constructed of graphene and/or other robust materials.

As shown in FIG. 1, a support assembly 1000 for a vehicle 901 in accordance with the present invention may include a spherical wheel/tire 1010, a drive system 1100 emoting the wheel/tire 1010 such that the vehicle 901 may be transported along a road surface. The vehicle 901 may be a manual or autonomous car, golf cart, motorcycle, military transport, etc. The drive system 1110 may magnetically levitate the vehicle 901 a first predetermined distance from the wheel/tire 1010 and magnetically maintain the drive system 1110 at a constant orientation relative to the road surface. Part of the drive system 1100 may be a magnetically passive component that responds to variations of a magnetic field. Another part of the drive system 1100 may be a magnetically active component that generates variations in the magnetic field. Either part may itself generate a constant magnetic field.

The spherical wheel/tire 1010 may include a spherical tread layer 1030, an internal spherical foam layer 1035, a spherical magnetic layer 1037, a permanent magnetic element 1041, and an electromagnetic element 1042. These layers 1030, 1035, 1037 may function similarly to layers of a conventional pneumatic tire, such as the tread, the belts, the overlay, the carcass, etc. At least one of the layers 1030, 1035, 1037 may include a material responsive to magnetic field variations such that the wheel/tires 1010 may be controllably rotated about a spherical center of the tire relative to the vehicle 901, the drive system 1100, and the road surface. The foam layer 1035 may include adjustable elements 1039 that may change their physical shape and properties when actuated by magnetic or electrical stimulus. The magnetic layer 1037 may include diamagnetic elements 1038 for activating/deactivating the adjustable elements 1039. The diamagnetic elements 1038 may be mounted to a support layer 1051 internal to the magnetic layer 1037. The drive system 1100 may include the magnetic layer 1037, the permanent magnetic element 1041, the electromagnetic element 1042, as well as, battery 1061 at the core of the spherical wheel/tire 1010, a spherical circuit layer 1063, one or more microprocessors 1065 (two shown), a radially extending fiber optic element 1067 for external communication, a radially extending electronic communication/power bus 1069, and an energy harvester 1071 disposed in the foam layer 1035.

An example spherical tread layer 1030 of the wheel/tire 1010 is made from a rubber composition comprising an elastomer bearing a multidentate ligand capable of complexing with a metal ion, and a metal ion.

In one embodiment, the elastomer is as described in Li et al., Nature Chemistry 8, 601-624 (2016). As described therein, the elastomer is a copolymer comprising polydimethylsiloxane chains with 2,6-pyridinecarboxamide ligands incorporated within the polymer chains.

In one embodiment, the rubber composition is as described in one or more of U.S. Pat. No. 8,962,730; U.S. Pat. No. 9,163,101; or U.S. Pat. No. 9,416,211. As disclosed therein, the rubber composition comprises a functionalized elastomer comprising a polymeric backbone chain derived from a monomer comprising at least one conjugated diene monomer and optionally at least one vinyl aromatic monomer; and a functional group bonded to the backbone chain, the functional group comprising a multidentate ligand capable of complexing with a metal ion; and a metal ion. There is further disclosed a pneumatic tire comprising the rubber composition.

In one embodiment, the functionalized elastomer has the structure (I)

$$X\text{-}[\text{-}Y\text{-}Z]_n \qquad (I)$$

where X is a polymer derived from a monomer comprising at least one conjugated diene monomer and optionally at least one vinyl aromatic monomer; Z is a functional group comprising a multidentate ligand capable of complexing with a metal ion; Y is a divalent group bonded to both X and Z; and n is the number of —[—Y-Z] groups bonded to X.

In one embodiment, the polymer X is a diene based elastomer comprising at least one carbon-carbon double bond. The preferred rubber or elastomers for use as polymer X are polyisoprene (natural or synthetic), polybutadiene and styrene-butadiene rubber.

The term "phr" as used herein, and according to conventional practice, refers to "parts by weight of a respective material per 100 parts by weight of rubber, or elastomer."

In one embodiment, the functional group Z comprising a multidentate ligand capable of complexing with a metal ion, includes but is not limited to substituted or unsubstituted bipyridinyl groups, substituted or unsubstituted terpyridinyl groups, substituted or unsubstituted phenanthrolinyl groups, and substituted or unsubstituted pyrazinyl groups, and the like.

In one embodiment, the functional group Z comprising a multidentate ligand capable of complexing with a metal ion is selected from the group consisting of substituted or unsubstituted bipyridinyl groups, substituted or unsubstituted terpyridinyl group, substituted or unsubstituted phenanthrolinyl group, or substituted or unsubstituted pyrazinyl group.

In one embodiment, the functional group Z comprising a multidentate ligand is a substituted or unsubstituted 2,2';6',2"-terpyridinyl group.

In one embodiment, the functional group Z comprising a multidentate ligand is a substituted or unsubstituted 2,2'-bipyridinyl group.

In one embodiment, the —[—Y-Z] group is selected from the group consisting of 6-(2,2';6',2"-terpyridin-4'-ylsulfanyl) hexyl-1-sulfanyl, 2,2';6',2"-terpyridin-4'-ylsulfanyl, and 4-(2,2';6',2"-terpyridin-4'-yl)phenylmethylsulfanyl.

Y is a divalent group bonded to both X and Z. In one embodiment, Y is sulfur or oxygen. In one embodiment, Y is sulfur.

The number n of —[—Y-Z] groups bonded to X ranges from about 2 to about 30 in a given copolymer molecule.

By "capable of complexing with a metal ion," it is meant that as part of the functionalized elastomer of formula I, the functional group Z may form a complex structure with a metal ion; such a metal ion may be present for example by addition of a metal salt during mixing of the functionalized elastomer in a rubber composition. Suitable metal ions include those known to complex with ligands, including but not limited to zinc ions, copper ions, iron ions, nickel ions, ruthenium ions, and the like. The complexation of the functional group Z with a metal ion may exist as a complex between a single functional group Z and the metal ion, or as a coordination complex between 2 or more functional groups Z and a metal ion.

The functionalized elastomer may be produced by various methods. In one embodiment, the functionalized elastomer may be produced by functionalizing the polymer X with functional group Z comprising a multidentate ligand capable of complexing with a metal ion. A convenient way for the functionalization of a variety of elastomers is the thiol-ene reaction during which alkene moieties being present in the elastomers are transformed into thioethers by reaction with thiols. This reaction proceeds preferably with vinyl groups as they are present in styrene-butadiene rubbers, butadiene rubbers, and polyisoprene rubbers. In order to allow the functionalization of the elastomers, the —[—Y-Z] grouping, where Y is sulfur, may be linked to the elastomer X through reaction of the thiol HS-Z with vinyl groups of the elastomer X to form a thioether of formula I, where Y is sulfur. Further details of the thiol-ene reaction as it relates to elastomers may be found by reference to U.S. Pat. Nos. 6,365,668 and 7,847,019, both fully incorporated by reference herein.

The metal ion is generally added in an amount sufficient to complex with the functionalized elastomer; depending on the amount of functionalized elastomer present in the rubber composition and the number of ligand groups in an elastomer molecule, the amount of metal ion required can be easily determined by one skilled in the art. Amounts of metal ion in excess of, or less than, the stoichiometric amount of metal ion may be used, depending on the desired effect.

In one embodiment, the metal ion includes divalent copper, divalent iron, divalent cobalt, divalent nickel, and divalent ruthenium, i.e., $Cu^{2+}$, $Fe^{2+}$, $Co^{2+}$, $Ni^{2+}$, $Zn^{2+}$ and $Ru^{2+}$.

In one embodiment, the metal ion is added to the rubber composition as a metal salt. In one embodiment, the metal ion is added to the rubber composition as a metal salt including $FeSO_4.7H_2O$, $FeCl_2$, $NiCl_2$, $RuCl_3$, cobalt stearate, zinc stearate, and the like. The rubber composition may optionally include, in addition to the functionalized elastomer and the metal ion, one or more rubbers or elastomers; the preferred rubber or elastomers are polyisoprene (natural or synthetic), polybutadiene and SBR.

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils.

The rubber composition may include from about 10 to about 150 phr of silica. In another embodiment, from 20 to 80 phr of silica may be used.

Commonly employed carbon blacks can be used as a conventional filler in an amount ranging from 10 to 150 phr. In another embodiment, from 20 to 80 phr of carbon black may be used.

In one embodiment the rubber composition may contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 0.1 to about 5 phr. Lower amounts of zinc oxide may be used to avoid complexation with the functionalized elastomer. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that this disclosure is not limited to those precise examples. As such, many modifications and variations will be apparent to practitioners skilled in this art.

Accordingly, it is intended that the scope of this disclosure be defined by the following claims and their equivalents. Furthermore, it is contemplated that a particular feature described either individually or as part of an example may be combined with other individually described features, or parts of other examples, even if the other features and examples make no mentioned of the particular feature. Thus, the absence of describing combinations does not preclude rights to such combinations.

While certain examples have been described above, it will be understood that the examples described are by way of example only. Accordingly, this disclosure should not be limited based on the described examples. Rather, the scope of the disclosure should only be limited in light of the claims that follow when read in light of the above description and accompanying drawings.

What is claimed:

1. A support assembly for a vehicle travelling along a road surface and rotating relative to the road surface and the vehicle comprising:
    a spherical tread layer for contacting the road surface;
    a foam layer adjacent the spherical tread layer, the foam layer including adjustable elements for altering an outer physical contour of the spherical tread layer, the outer physical contour contacting the road surface;
    a spherical wheel/tire for supporting the spherical tread layer and the vehicle; and
    a drive system magnetically driving rotation of the spherical wheel/tire relative to the vehicle such that no portion of the spherical tread layer physically contacts the vehicle, the drive system including a radially extending fiber optic element for external communication, a radially extending electronic communication/power bus, and an energy harvester disposed in the foam layer.

2. The support assembly as set forth in claim 1 wherein the drive system magnetically levitates the vehicle a first predetermined distance from the spherical wheel/tire and magnetically maintains the drive system at a constant orientation relative to the road surface.

3. The support assembly as set forth in claim 1 wherein the spherical tread layer comprises a rubber composition comprising an elastomer bearing a multidentate ligand capable of complexing with a metal ion, and a metal ion.

4. The support assembly as set forth in claim 3 wherein the elastomer is a copolymer comprising polydimethylsiloxane chains with 2,6-pyridinecarboxamide ligands incorporated within the polymer chains.

5. The support assembly as set forth in claim 3 wherein the elastomer comprises a functionalized elastomer comprising a polymeric backbone chain derived from a monomer comprising at least one conjugated diene monomer and optionally at least one vinyl aromatic monomer; and a functional group bonded to the backbone chain, the functional group comprising a multidentate ligand capable of complexing with a metal ion.

6. The support assembly as set forth in claim 5 wherein the functionalized elastomer is of formula (I)

$$X\text{-}[Y\text{-}Z]_n \qquad (I)$$

wherein X is a polymer derived from a monomer comprising at least one conjugated diene monomer and optionally at least one vinyl aromatic monomer, Z comprises a multidentate ligand group capable of complexing with a metal ion, Y is a divalent group bonded to both X and Z, and n is the number of -[Y-Z] groups bonded to X.

7. The support assembly as set forth in claim 6 wherein Z comprises a ligand selected from the group consisting of a substituted bipyridinyl groups, unsubstituted bipyridinyl groups, substituted terpyridinyl groups, unsubstituted terpyridinyl groups, substituted phenanthrolinyl groups, unsubstituted phenanthrolinyl groups, substituted pyrazinyl groups, and unsubstituted pyrazinyl groups.

8. The support assembly as set forth in claim 1 wherein the drive system includes a magnetically passive component that responds to variations of a magnetic field.

9. The support assembly as set forth in claim 8 wherein the drive system includes a magnetically active component that generates variations in the magnetic field.

10. A support assembly for a vehicle travelling along a road surface and rotating relative to the road surface and the vehicle comprising:
    a spherical tread layer for contacting the road surface;
    a foam layer disposed radially inward of the spherical tread layer;
    a magnetic layer disposed radially inward of the foam layer, the magnetic layer including diamagnetic elements for penetrating a magnetic field with an opposed polarity to a permanent magnet of the vehicle; and
    a drive system magnetically driving rotation of the magnetic layer relative to the vehicle such that no portion of the spherical tread layer physically contacts the vehicle.

11. The support assembly as set forth in claim 10 wherein the drive system includes a permanent magnetic element and an electromagnetic element.

12. The support assembly as set forth in claim 10 wherein the foam layer includes a material responsive to magnetic field variations such that the support assembly is controllably rotated about a spherical center of the spherical tread layer.

13. The support assembly as set forth in claim 10 wherein the drive system magnetically levitates itself a second predetermined distance from an outer surface of the spherical tread layer.

14. A method for supporting a vehicle, the method comprising the steps of:
    travelling along a road surface by the vehicle;
    rotating a spherical tread layer relative to the road surface and the vehicle with the spherical tread layer rolling along the road surface;
    magnetically driving rotation of a magnetic layer relative to the vehicle such that no portion of the spherical tread layer physically contacts the vehicle;
    adjusting an outer contour of the spherical tread layer for improving the contact between the outer contour and the road surface;
    altering a physical shape of an adjustable element radially beneath the spherical tread layer; and
    powering alteration of the adjustable element by an energy harvester.

15. The method as set forth in claim 14 further including the step of magnetically altering the adjustable element by the energy harvester.

16. The method as set forth in claim 14 further including the step of magnetically levitating the vehicle a first predetermined distance from the spherical tread layer.